United States Patent

Fujiwara et al.

Patent Number: 5,838,410
Date of Patent: Nov. 17, 1998

[54] OPTICAL MODULATION ELEMENT

[75] Inventors: Ryoji Fujiwara, Chigasaki; Shuzo Kaneko, Yokohama; Akio Maruyama, Tokyo; Tomoko Maruyama, Isehara; Tomoko Murakami, Atsugi, all of Japan

[73] Assignee: Canon Kabushiki Kaisha, Tokyo, Japan

[21] Appl. No.: 224,662

[22] Filed: Apr. 7, 1994

Related U.S. Application Data

[62] Division of Ser. No. 857,509, Mar. 25, 1992, Pat. No. 5,327,272.

[30] Foreign Application Priority Data

Mar. 27, 1991 [JP] Japan ................................. 3-063200
Jul. 26, 1991 [JP] Japan ................................. 3-208930

[51] Int. Cl.⁶ .............................................. G02F 1/1335
[52] U.S. Cl. ................................... 349/123; 349/132
[58] Field of Search .......................... 359/56, 75, 78, 359/84; 349/123, 132

[56] References Cited

U.S. PATENT DOCUMENTS

| | | | |
|---|---|---|---|
| 4,005,928 | 2/1977 | Kmetz et al. ........................ | 359/99 |
| 4,367,924 | 1/1983 | Clark et al. . | |
| 4,494,824 | 1/1985 | Nakamura et al. .................. | 359/75 |
| 4,765,720 | 8/1988 | Toyono et al. ...................... | 359/56 |
| 4,840,462 | 6/1989 | Hartmann . | |
| 4,932,757 | 6/1990 | Hanyu et al. ....................... | 359/79 |
| 4,938,569 | 7/1990 | Tsunoda et al. .................... | 359/68 |
| 5,061,044 | 10/1991 | Matsunaga ......................... | 359/75 |
| 5,085,498 | 2/1992 | Yamamoto et al. ................. | 359/70 |
| 5,118,538 | 6/1992 | Escher et al. ....................... | 428/1 |
| 5,126,867 | 6/1992 | Ishiwata ............................. | 359/75 |
| 5,130,830 | 7/1992 | Fukushima et al. ................ | 359/72 |
| 5,152,918 | 10/1992 | Murata et al. ...................... | 359/75 |
| 5,153,755 | 10/1992 | Higa ................................... | 359/75 |
| 5,165,076 | 11/1992 | Tsuboyama et al. ............... | 359/75 |
| 5,172,257 | 12/1992 | Pertel ................................. | 359/84 |
| 5,196,954 | 3/1993 | Yamazaki et al. .................. | 359/75 |
| 5,231,523 | 7/1993 | Nakaya et al. ..................... | 359/75 |
| 5,239,398 | 8/1993 | Yanagisawa et al. ............... | 359/75 |
| 5,260,817 | 11/1993 | Kaneko et al. ..................... | 359/75 |
| 5,270,844 | 12/1993 | Maruyama et al. ................ | 359/79 |
| 5,327,272 | 7/1994 | Fujiwara et al. ................... | 359/75 |

FOREIGN PATENT DOCUMENTS

| | | |
|---|---|---|
| 0374865 | 6/1990 | European Pat. Off. . |
| 0353760 | 7/1990 | European Pat. Off. . |
| 0412408 | 2/1991 | European Pat. Off. . |
| 0416936 | 3/1991 | European Pat. Off. . |
| 31119 | 2/1985 | Japan . |
| 117524 | 6/1986 | Japan . |
| 62-295028 | 12/1987 | Japan . |
| 63-121020 | 5/1988 | Japan . |
| 10326 | 1/1990 | Japan . |
| 021920 | 1/1991 | Japan . |
| 125520 | 4/1992 | Japan . |

OTHER PUBLICATIONS

Patent Abstracts of Japan (JP3–227376) vol. 15, No. 512 (1991) C–0898).
Patent Abstracts of Japan (JP1–261469), vol. 14, No. 20 (1989) C–676.
Patent Abstracts of Japan (JP60–120772), vol. 9, No. 271 (1985).
Hartmann, Proceedings SID (1989) vol. 30, No. 2, 99:103.
Clark et al., App. Phys. Lett. (1980) vol. 36, No. 11, 899:901.
Solid State Physics (1981) vol. 16, No. 3, 141:151.
Mayer et al., Phys. Abs. (1975) vol. 36, No. 3, 69:71.

*Primary Examiner*—William L. Sikes
*Assistant Examiner*—James A. Dudek

[57] ABSTRACT

An optical modulation element, in which a pixel surrounding a ferroelectric liquid crystal layer and an column shaped orientation layer is formed between a pair of electrodes. The orientation layer is formed by a high-molecular polymer in which an ultrafine granular conductive substance may be dispersed. External voltage applied across the electrodes in response to gradation signals performs gradation drivings.

15 Claims, 12 Drawing Sheets

FIG. 3A
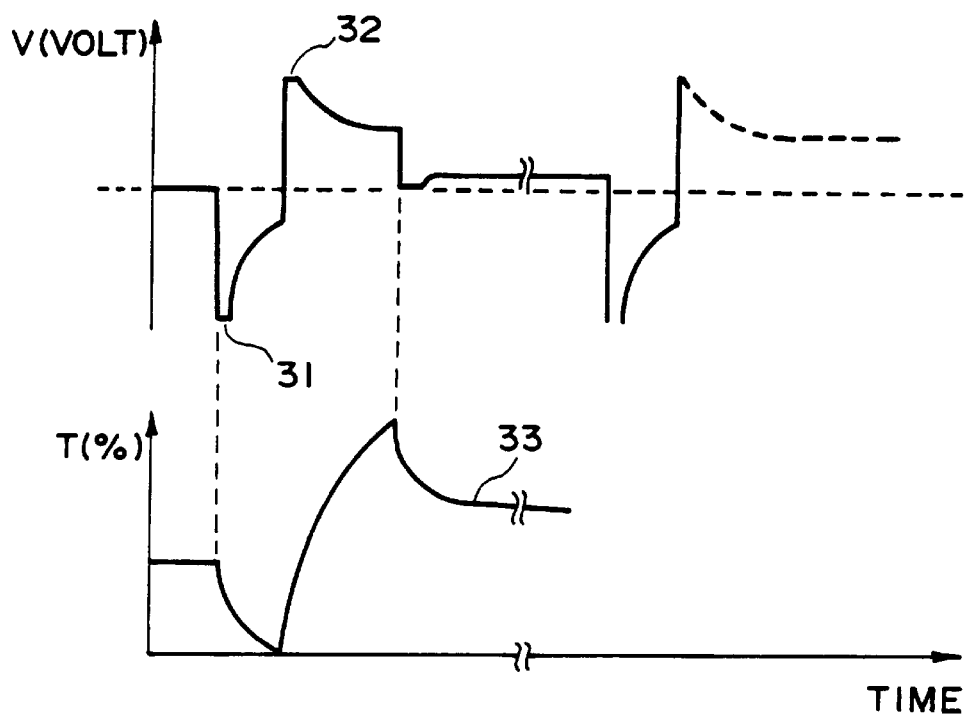
FIG. 3B
FIG. 4
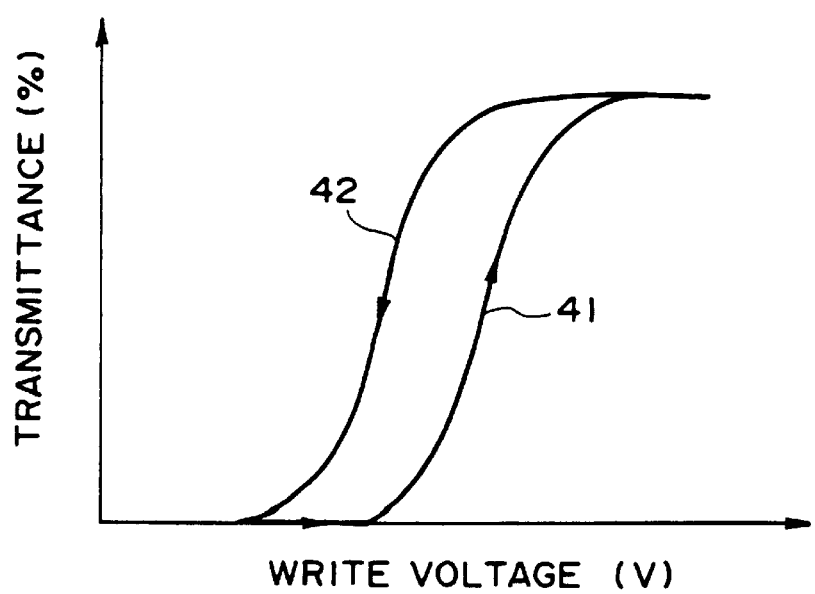

CORRESPONDING
TO 42

CORRESPONDING
TO 41

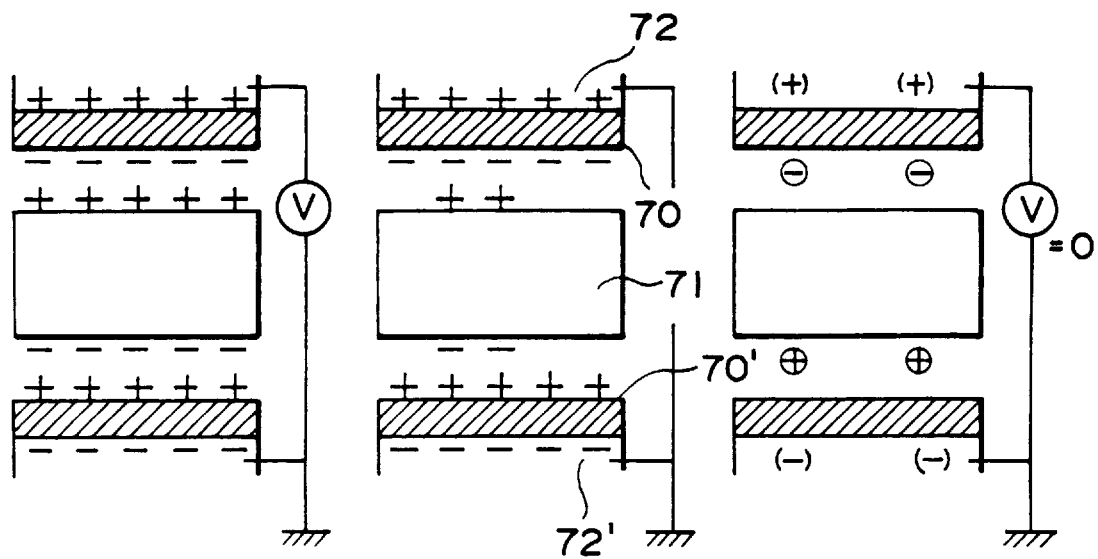
F I G. 7
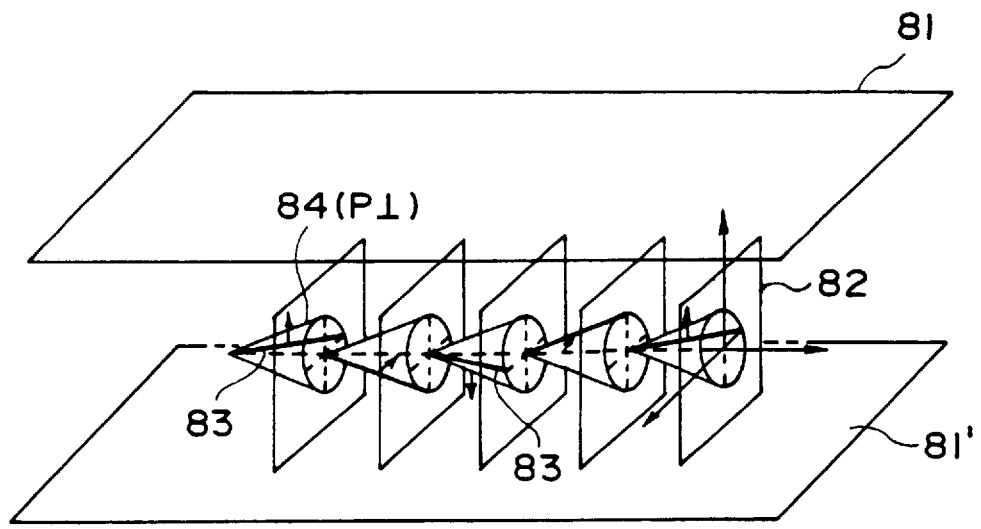
F I G. 8

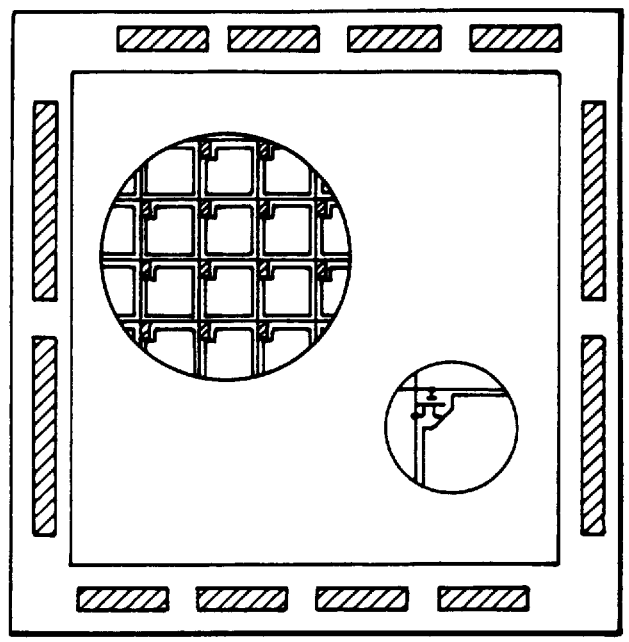
F I G. 13
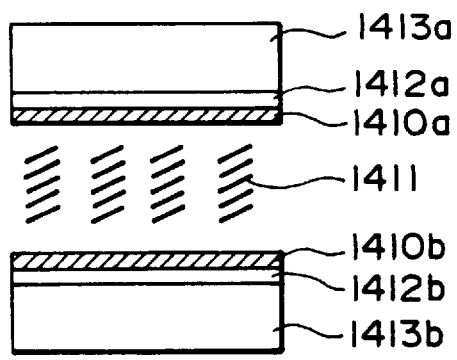
F I G. 14

FIG. 15A
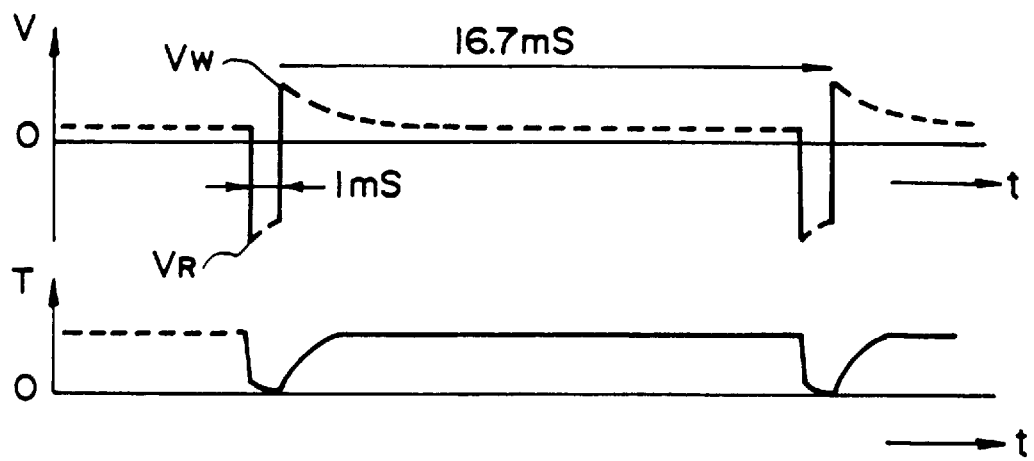
FIG. 15B
FIG. 16
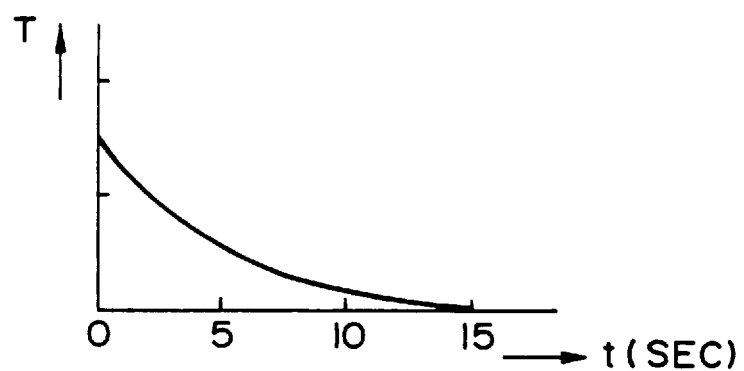

OPTICAL MODULATION ELEMENT

This application is a continuation of application Ser. No. 07/857,509, filed Mar. 25, 1992 now U.S. Pat. No. 5,327,272.

BACKGROUND OF THE INVENTION

1. Field of the Invention

The present invention relates to an optical modulation element for displaying gradation. More particularly, the invention relates to a liquid crystal element for displaying gradation using a liquid crystal having at least two stable states such as a ferroelectric liquid crystal.

2. Related Background Art

In the conventional liquid crystal television panel using an active matrix driving system, thin film transistors (TFT) are arranged in matrix for each of the pixels, and gate-on pulses are applied to the TFT to provide an on state between the source and drain of the TFT. Then, image signals are applied from the source and accumulated in a capacitor. In response to the accumulated image signals, the liquid crystal (twisted nematic: TN-liquid crystal, for example) is driven and at the same time, gradation is displayed by modulating the voltage of the image signals.

However, an active matrix driving television panel using a TN liquid crystal of the kind or an STN (super-twisted nematic) liquid crystal is as slow as several hundreds milliseconds in its response speed. Therefore, there is a problem to be encountered in using it for television driving of the ED or HD (high vision) for which future developments are anticipated.

Also, the ferroelectric liquid crystal (FLC) is being developed aggressively as a liquid crystal having spontaneous polarization for the purpose of using as a display element, light bulb, and others because of the higher responsiveness, memory capability, along with other advantages of this liquid crystal. Targets for the best use of the above-mentioned advantages include the optical shutter array, high-precision display element driven by a simple matrix, light bulb for high-density recording combined with a photoconductor, and potentially an active matrix driving animated image display using the thin film transistor (TFT) and others. The characteristics thereof are disclosed in U.S. Pat. No. 4,840,462, Proceeding of the SID, VOL. 30/2, 1989 [Ferroelectric Liquid Crystal Video Display] and others, for example.

Nevertheless, there are various difficult problems to be solved before the implementation of a gradation display using the FLC. Particularly, for the cells using the FLC, a passivation film is used for the prevention of the short circuit, which generates an inverse field. This inverse field produces an adverse effect on the gradation display.

SUMMARY OF THE INVENTION

It is an object of the present invention to provide an FLC optical modulation element suited for the gradation display.

It is another object of the present invention to provide an FLC optical modulation element with an improved orientation, which is suited for the gradation display.

A first feature of the present invention is that in an optical modulation element in which a pixel having an orientation layer having a ferroelectric liquid crystal layer orientated thereon, is formed between a pair of electrodes, and an external voltage corresponding to a gradation signal is applied across the above-mentioned electrodes in order to perform a gradation driving, wherein the material of the above-mentioned orientation layer is a high-molecular polymer with dispersed ultrafine granular conductive substance.

A second feature of the present invention is that in an optical modulation element in which a pixel having at least a liquid crystal layer between a pair of electrodes is formed, the pixel is modulated by applying an external voltage across the electrode, wherein at least one side of the pixel is formed with an electrode, a high-molecular polymer having conductivity, and a column type orientation layer sequentially.

A third feature of the present invention is that in an optical modulation element in which a pixel having at least a ferroelectric liquid crystal layer between a pair of electrodes is formed, an external voltage corresponding to a gradation signal is applied across the electrodes in order to perform a gradation driving, wherein at least one side of the pixel is formed with an electrode, a high-molecular polymer having conductivity, and a column type orientation layer sequentially.

BRIEF DESCRIPTION OF THE DRAWINGS

FIG. 3 is a graph showing the relationship between driving waveform and transmittance.

FIG. 4 is a graph showing the relationship between write voltage and transmittance.

FIG. 7 is a graph showing the cut-off phenomenon of the liquid crystal response due to DC component.

FIG. 8 is a schematic view showing an example of the ferroelectric liquid crystal cell.

FIG. 13 is a view showing a general structure of a liquid crystal element formed in an active matrix.

FIG. 14 is a cross-sectional view illustrating a conventional liquid crystal element.

FIG. 15 is a view showing a general driving waveform of a liquid crystal element.

FIG. 16 is a view showing the relationship between the driving time and transmittance when the driving waveform shown in FIG. 7 is applied to the element shown in FIG. 14.

DETAILED DESCRIPTION OF THE PREFERRED EMBODIMENTS

A ferroelectric liquid crystal is as fast as several hundred microseconds in its response speed. As a result, attempts have been made recently to use the ferroelectric liquid crystal for the gradation driving of television.

As an example of the system, there is a charge control driving of a ferroelectric liquid crystal. This is a system to utilize the correlation which is present between the inverted area (a) of a ferroelectric liquid crystal domain and an injected charge amount (q).

$$Q = f(P_s, a) \qquad (1)$$

where $P_s$ is the spontaneous polarization of the ferroelectric liquid crystal. Then, the gradation display is performed by injecting the charge in an amount corresponding to the inverted area for each of the image representations of the ferroelectric liquid crystal.

While the above-mentioned charge control driving is a highly effective means for the gradation display using a bistable ferroelectric liquid crystal, there is hysteresis in the voltage-transmittance characteristics. Hereunder, this phenomenon will be described.

Figure 1:
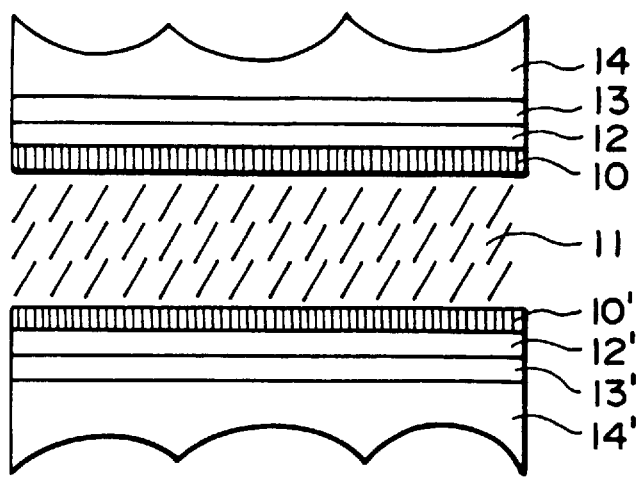
FIG. 1 is a schematic view showing an example of a general ferroelectric liquid crystal.

FIG. 1 is a view showing the structure of a ferroelectric liquid crystal generally in use. In FIG. 1, reference numerals 14 and 14' designate substrates; 13 and 13', transparent conductive layers; 12 and 12', insulating layers; 10 and 10', orientation layers; and 11, a ferroelectric liquid crystal.

Figure 2:
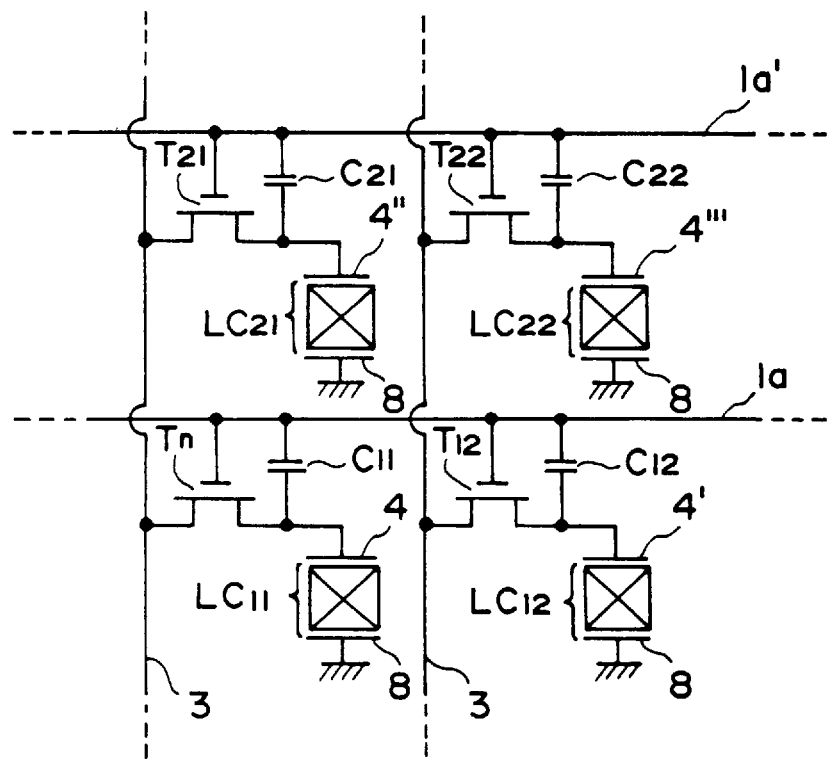
FIG. 2 is a view showing an equivalent circuit for performing the gradation display by an active matrix charge control drive using a ferroelectric liquid crystal.

FIG. 2 is a view showing an equivalent circuit for the performance of the gradation display by the active matrix charge control driving using the ferroelectric liquid crystal. In FIG. 2, reference marks $T_{11}$, $T_{12}$, $T_{21}$, $T_{22}$, ... designate thin film transistors (TFT) used for the switching elements for the active matrix driving; $LC_{11}$, $LC_{12}$, $LC_{21}$, $LC_{22}$, ... designate pixels comprising the ferroelectric liquid crystal formed respectively between the drain electrodes 4, 4', 4'', 4''', ... of the TFT $T_{11}$, $T_{12}$, $T_{21}$, $T_{22}$, ... and the opposite electrodes 8; and $C_{11}$, $C_{12}$, $C_{21}$, $C_{22}$, ... designate capacitors for the charge accumulation of the driving signals formed by the gate lines $1_a$, $1_a'$, ... and the drain electrodes 4, 4', 4'', 4''', .... Now, when the above-mentioned circuit a reset pulse 31 and a write pulse corresponding to each of the gradations are applied to each of the pixels with the driving waveform of 16.7 ms per cycle (60 Hz) as shown at (a) in FIG. 3, the transmittance shown at (b) in FIG. 3 is generated. At this juncture, the transmittance at 33 is a transmittance substantially corresponding to the write pulse at 32.

Here, the above-mentioned voltage-transmittance characteristics are the plot of the transmittance at 33 with respect to the write pulse at 32 having such driving waveform. An example thereof is shown in FIG. 4. As clear from FIG. 4, there is noticed the so-called hysteresis having different transmittances at the voltage rising time 41 and falling time 42.

Figure 5A:
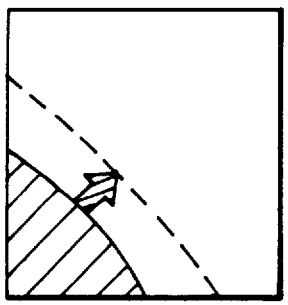
FIG. 5($a$) and FIG. 5($b$) are schematic views showing the hysteresis qualitatively.
Figure 5B:
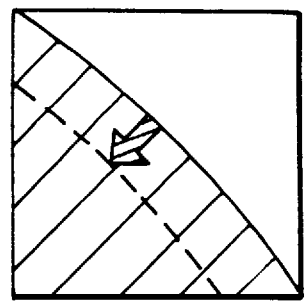

FIG. 5(a) and FIG. 5(b) are views illustrating the above-mentioned hysteresis qualitatively. FIG. 5(b) corresponds to the reference numeral 41 in FIG. 4, that is, the direction in which the black domain is being reduced, and from the viewpoint of the driving, it is necessary to perform white writing after resetting. On the other hand, FIG. 5(a) represents the direction in which the black domain is on the increase, and from the viewpoint of driving, it is unnecessary to perform writing after resetting. In other words, regarding the write pulses, the former (41) requires a greater voltage than the latter (42).

As described above, when a gradation display is performed by the charge control system using the driving method shown in FIG. 3, hysteresis is inevitably generated in the voltage-transmittance characteristics.

Moreover, when the active matrix driving as mentioned above is conducted, there occurs a problem that the cut-off of the liquid crystal response may result due to a continuous application of a direct current (DC) voltage component over a long period of driving operation. As a cause thereof, it is conceivable that deviation of the internal ion of the liquid crystal is inducted by the DC component mentioned above to form an electric field.

Figure 6:
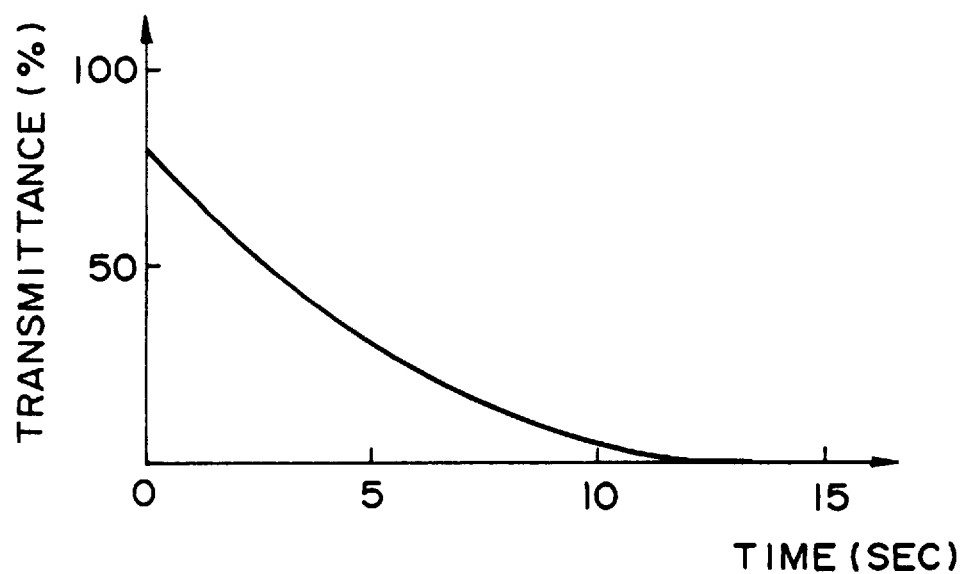
FIG. 6 is a graph showing the cut-off phenomenon of the liquid crystal response due to DC component.

FIG. 6 shows the phenomenon appearing when the driving waveform shown in FIG. 3 is applied. It is clearly noticeable in FIG. 6 that the transmittance is on the gradual decrease due to the repeated pulse application. Now, in conjunction with FIG. 7, this phenomenon will be described. Geometrically, in the waveform shown in FIG. 3, the liquid crystal senses if a positive DC component is being excessively applied. FIG. 7 illustrates the way in which this DC component affects the liquid crystal.

Due to the application of the positive DC component, an accumulation of a charge (+ charge 72 and –charge 72') takes place between the insulating layers 70 and 70' and liquid crystal portion 71. Then, by this accumulated charge component, the direction of the deviation of the liquid crystal is caused to be in the negative direction. As a result, it becomes increasing difficult to perform "white" writing.

When a gradation display is performed by the active matrix system, it is impossible to determine the pixel display voltage uniformly due to the above-mentioned hysteresis or the cut-off driving phenomenon resulting from the DC component.

Therefore, in an active matrix optical modulation element for the gradation display according to the present invention, it becomes possible to eliminate the above-mentioned hysteresis or the unsteadiness caused by the DC component by giving resistivity to the orientating film using a high-molecular polymer with dispersed ultrafine granular conductive substance for the orientation layer.

Now, hereinafter, the description will be made of the embodiments according to the present invention subsequent to the description of an optical modulation substance used for the present invention.

As an optical modulation substance used for the present invention, a substance having a first optically stable state (which forms a bright state, for example) and a second optically stable state (which forms a dark state, for example) in response to an electric field to be given, that is, a substance having at least a bistable state with respect to its electric field, particularly a liquid crystal having such a characteristics as this is best suited.

As a liquid crystal having at least a bistable state usable for an optical modulation element according to the present invention, chiral smectic liquid crystals having ferroelectricity are most preferable. Among them, the liquid crystals of chiral smectic C phase (SmC*), H phase (SmH*), I phase (SmI*), F phase (SmF*), and G phase (SmG*) are suitable. As regards a ferroelectric liquid crystal of these kinds, there are disclosures such as "LE JOURNAL DE PHYSIQUE LETTER" L-69, 1975, Ferroelectric Liquid Crystals: "Applied Physics Letters" V-36, No. 11, 1980, Submicro Second Bistable Electro-Optic Switching in Liquid Crystals: "Solid Physics"16 (141), 1981, Liquid Crystals, and it is possible to use any one of these known ferroelectric liquid crystals for the present invention.

More specifically, as examples of ferroelectric liquid crystal compounds which can be used for the present invention, decyloxy benzyliden-P'-amino-2-methylbuthyl cinnamate(DOBAMBC), hexyloxy benzyliden-P'-amino-2-chloropropyl-cinnamate (HOBACPC), and 4-0-(2-methyl)-butylresol sliden-4'-octylaniline (MBRAB) can be named.

When an element is formed using these materials, it may be possible to support the element with a copper block in which a heater is embedded if required in order to keep the condition of a temperature to make the liquid crystal compound SmC*, SmH*, SmI*, SmF*, and SmG*.

Figure 9:
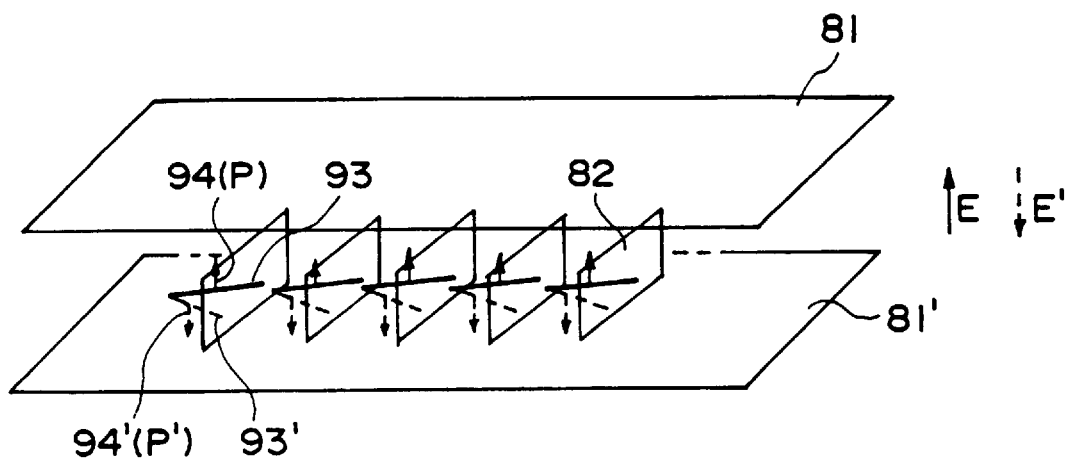
FIG. 9 is a schematic view showing an example of the ferroelectric liquid crystal cell.

FIG. 8 illustrates schematically an example of a ferroelectric liquid crystal cell. Reference numerals 81 and 81' designate substrates (glass plates) with transparent electrodes of $IN_2O_3$, $SnO_2$, ITO (indium-tin-oxide) and others being coated thereon, with an SMC* phase liquid crystal on which a liquid crystal molecular layer 82 is orientated vertically to the glass plane (chevron structure) sealed between them. The lines represented by thick solid lines at 83 indicate the liquid crystal molecule. This liquid crystal molecule 83 has a bipole moment (P⊥) 84 in the direction rectangular to its molecule. When a voltage greater than a predetermined threshold value is applied across the electrodes provided over the substrates 81 and 81', the spiral structure of the liquid crystal molecules 83 is unwound so that the orientating direction of the liquid crystal molecules 83 can be modified to orientate all bipole moments (P⊥) 84 in the direction of the electric field. The liquid crystal molecule 83 is of a thin oblong shape, and refractive indices in its longer axis and shorter axis directions are anisotropic. Therefore, if, for example, polarizers are arranged on the upper and lower faces of glasses in a positional relation of cross-Nichols to each other, a liquid crystal modulation element is provided which varies its optical characteristics depending on the polarities of an applied voltage. Further, when the thickness of the liquid crystal cell is made sufficiently thin (1 $\mu$, for example), the spiral structure of the liquid crystal is unwound (non-spiral structure) even when no electric field is applied as shown in FIG. 9, and its bipole moment p or p' shows either upward (94) or downward (94') orientating state. When an electric field E or E' having different polarity of more than a predetermined threshold value is applied to such cell as shown in FIG. 9, the cell changes its orientation either upward 94 or downward 94' in response to the electric field vector of the bipole moment electric field E or E'. In accordance therewith, the liquid crystal molecules are orientated either to the first stable state 93 (bright state) or to the second stable state 93' (dark state).

There are two advantages in using such ferroelectric liquid crystal for an optical modulation element. Firstly, the response velocity is extremely fast. Secondly, the orientation of the liquid crystal molecules is stable. In describing the second advantage in conjunction with FIG. 9, for example, the liquid crystal molecules are orientated to the first stable state 93 when the electric field E is applied. Then, even if the electric field is cut off in this state, the first stable state 93 is maintained. If the electric field E' in the inverted direction is applied, the liquid crystal molecules are orientated to the second stable state 93' and its orientation is changed, but likewise, this state is maintained even if the electric field is cut off. The memory function is provided in each of the stable states. In order to implement such rapid velocity of response and bistable capability, it is preferable to make the cell as thin as possible. In general, it should be 0.5 $\mu$m to 20 $\mu$m, its thickness and of 1 $\mu$m to 5 $\mu$m is suitable. A liquid crystal electroptic apparatus using a ferroelectric liquid crystal of the kind has been proposed in U.S. Pat. No. 4,367,924 and U.S. Pat. No. 4,840,462.

Now, in accordance with the embodiments, the detailed description will be made of an optical modulation element according to the present invention.

Figure 10:
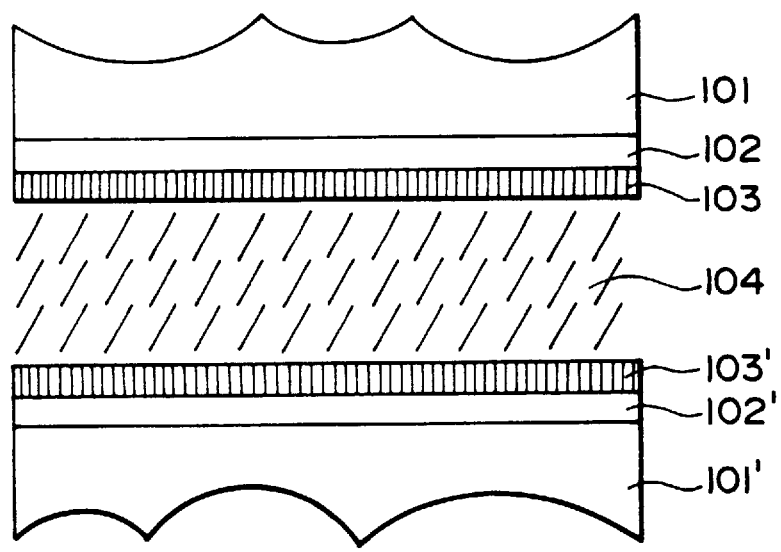
FIG. 10 is a schematic view showing an example of an optical modulation element according to the present invention.

FIG. 10 is a schematic view showing an example of an optical modulation element according to the present invention. In FIG. 10, reference numerals 101 and 101' designate substrates; 102 and 102', transparent conductive films formed by ITO films; 103 and 103', high-molecular polymers with dispersed ultrafine granular conductive substance, that is, more specifically, FLC orientation films formed by rubbing polysiloxane film with dispersed $SnO_2$:Sb ultrafine grains; and 104, a ferroelectric liquid crystal layer.

The substrates 101 and 101' are made of non-alkali glass NA 40 (manufactured by Hoya Glass Inc.) having a thickness of 1.1 mm, and the ITO films 102 and 102' are formed in a thickness of 700 Å by a reactive RF ion plating method in an oxygen gas. The polysiloxane orientation layer is formed by a rubbing process of the polysiloxane: $SnO_2$ film of 500 Å which is obtained using a dispersion solution in which siloxane is provided as a solid portion in a solvent and a mixture of ethylsilica and $SnO_2$: ultrafine grains is added in a 2.5 wt %, having a conductor ratio of $SnO_2$: Sb of this solid portion of 40%. After spinner coating of this dispersion solution, a heating treatment is given for one hour at 150° C.

In this respect, the liquid crystal gap is formed with silica beads of 1.5 $\mu$m $\phi$, and ferroelectric liquid crystals are injected thereinto.

Figure 11:
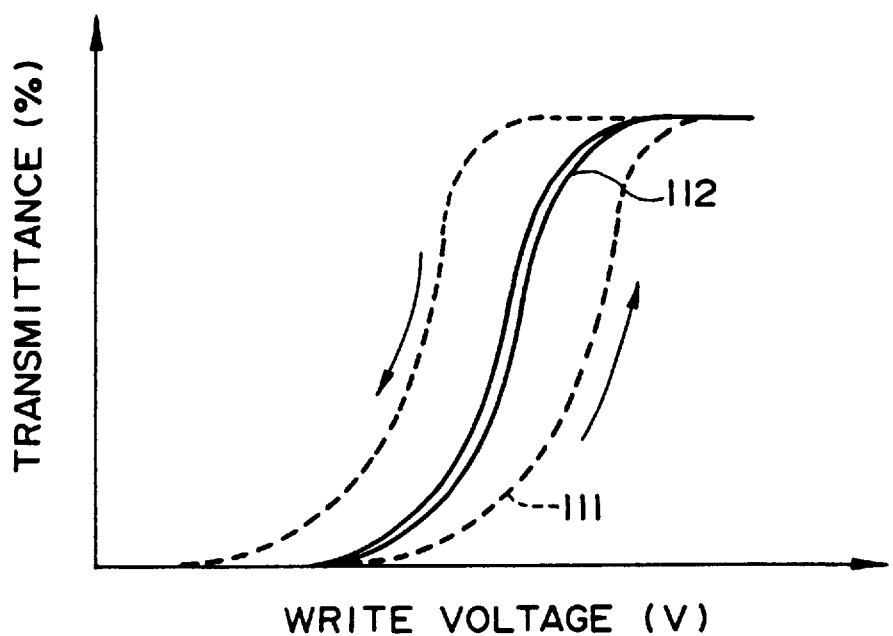
FIG. 11 is a graph showing the V-T characteristics of an optical modulation element according to the present invention and the V-T characteristics of a conventional FLC.

The orientational state of the obtained FLC shows an overall uniformity. The V-T curve thus obtained is shown at 112 in FIG. 11. As is clear from FIG. 11, the hysteresis in the V-T characteristics has definitely been reduced as compared with the polysiloxane orientation film for which no $SnO_2$: Sb is dispersed (represented by broken lines at 111 in FIG. 11).

Figure 12:
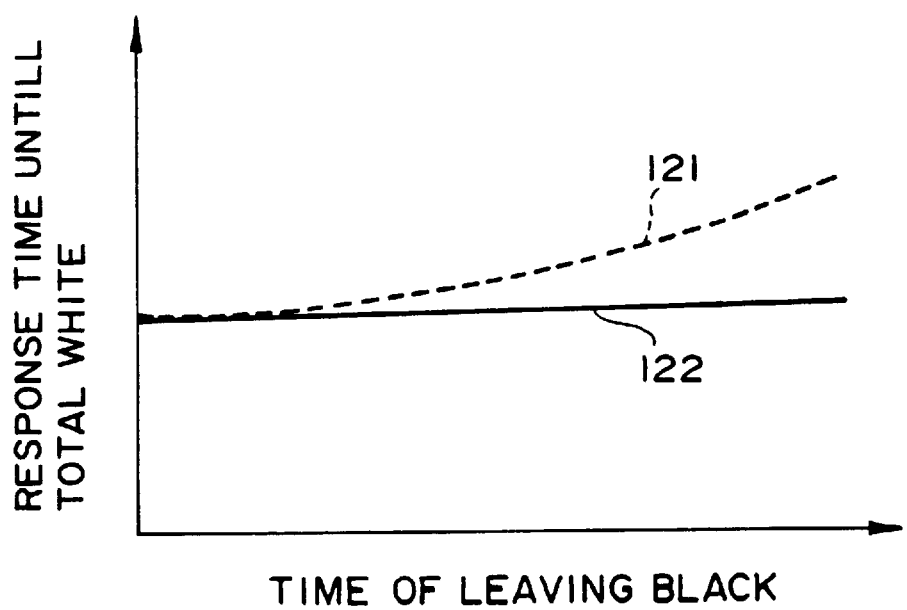
FIG. 12 is a graph showing the correlation of white write time by an optical modulation element according to the present invention and a conventional FLC in accordance with the time differential in leaving black.

Also, FIG. 12 shows the correlation of the response time required to write the total white when the black reset leaving time is changed. In FIG. 12, reference numeral 121 designates the polysiloxane orientation film of FLC in which no $SnO_2$:Sb is dispersed and 122, represents the FLC of the present embodiment. As is clear from FIG. 12, the unstableness due to the DC component has been eliminated in the FLC according to the present invention.

Also, according to the present invention, it is possible to use a dispersion solution having a solid portion of conductor ratio 80% dispersed in a siloxane solvent for 2.5 w %.

This dispersion solution is coated on the ITO substrates by spinner in the same manner as described earlier, and the rubbing process is performed after one-hour baking at 150° C. Then, the liquid crystals are injected subsequent to the cell assembly.

When the orientational state of the above-mentioned element is observed by a polarization microscope, it is noticed that its orientation shows the overall uniformity as in the case described earlier and that the hysteresis in its V-T characteristics has been reduced significantly.

Also, in the present invention, it is possible to obtain a uniform orientation as well as to attain the reduction of the hysteresis in the V-T characteristics even with a polysiloxane orientation film having a conductor ratio other than the aforesaid example (conductor ratio 40 to 90 wt %).

Also, with an assumption of a driving in an active matrix structure shown in FIG. 13, a phenomenal example resulting from the DC component is shown in FIG. 16 with respect to the cell shown in FIG. 14 in a case where reset pulses and write pulses are continuously applied to the FLC at a driving frequency of approximately 30 Hz to 60 Hz television rate as shown in FIG. 15. In this case, a problem is observed in that transmittance is gradually reduced by the repeated application of the reset voltage $V_R$ and write voltage $V_W$ as shown in FIG. 15. It seems geometrically as if a positive DC component has been applied excessively.

Figure 17:
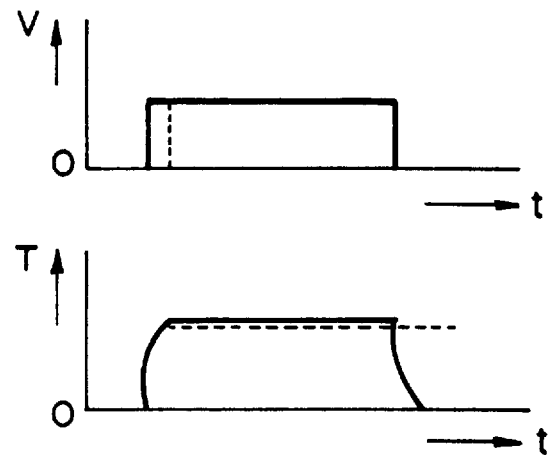
FIG. 17 is a view illustrating the respective elapsed time characteristics of the pulse waveform applied to the element shown in FIG. 14 and transmittance.

A phenomenon which is easier to understand will be shown in FIG. 17.

With respect to the structure shown in FIG. 14, a positive step voltage as shown in the upper stage in FIG. 17 is applied. Then, an optical response when the voltage becomes zero after a certain period is shown in the lower stage in FIG. 17. Here, the cell shown in FIG. 14 is a cell having a memory capability, and is caused to return to the "black" state by the inverted voltage due to the aforesaid charge accumulation in a case of a long period pulse application although in a short period voltage application, the transmittance is maintained subsequent to the "white" write as indicated by the dotted line in the lower stage in FIG. 17.

Figure 18:
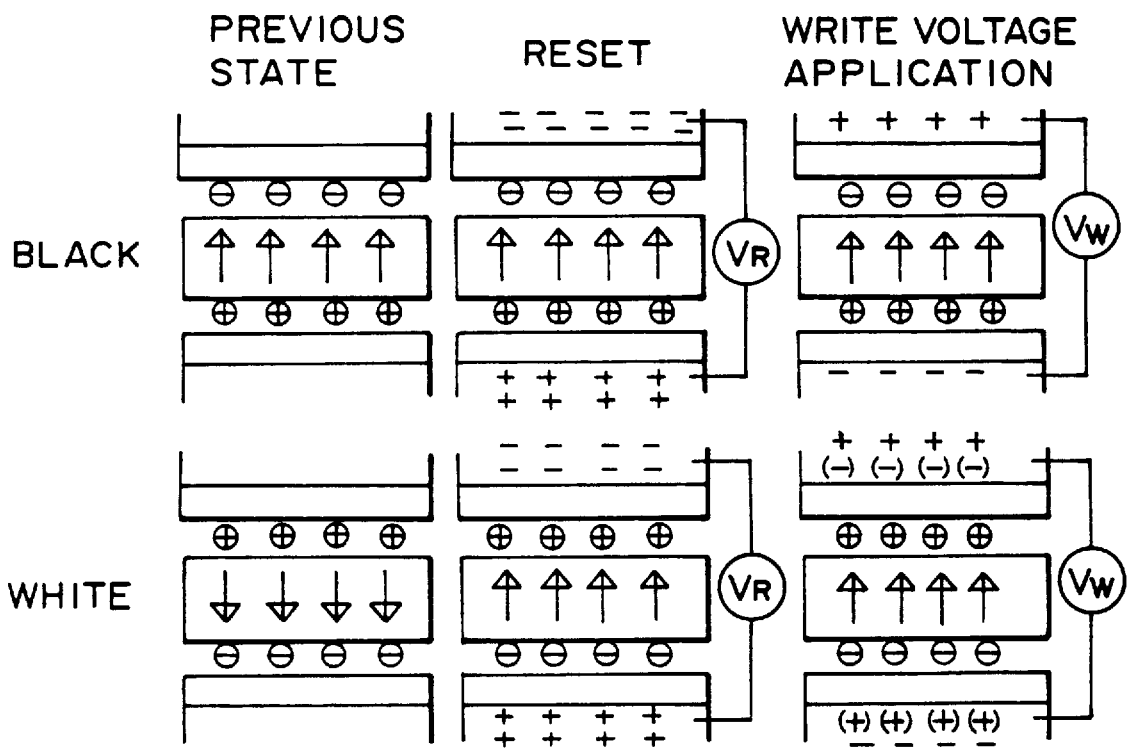
FIG. 18 is a view illustrating the state of the accumulated charge when the element shown in FIG. 14 is driven.

Further in FIG. 18, a hysteresis which might have been caused by a spontaneous polarization will be described qualitatively. In the upper stage in FIG. 18 are the direction of the spontaneous polarization in the "black" stable state and the polarity of the accumulated charge which is conceivably inducted thereby, and in the lower stage are, the direction of the spontaneous polarization in the "white" stable state and the polarity of the accumulated charge which is conceivably inducted thereby.

Due to the above-mentioned difference in the polarities of the inducted charge accumulations, the voltage applied to the liquid crystal portion is different depending on whether the previous state has been "black" or "white" even when the same "black" write voltage $V_W$ is applied. Then, if the previous state is white, a larger voltage is applied to the liquid crystal portion. It is therefore considered that the hysteresis and other phenomena are generated accordingly.

In order to avoid electrical instabilities of these kinds, it may be possible to eliminate the conventional rubbing orientation layer, or the above-mentioned insulating layer portion which is provided with the orientational layer. Adverse effects may frequently occur such as that an orientation having a sufficiently high uniformity is not obtainable, among others.

Furthermore, in the case of a ferroelectric liquid crystal, the thickness of the liquid crystal layer is as thin as 1 μm to 5 μm. Therefore, if the insulating layer portion is removed as described above, there is a possibility that due to the short circuit between the upper and lower electrodes, the element is damaged as a whole.

According to the present invention, it is arranged to avoid and direct forming of the FLC between the electrodes, thereby to prevent short circuit from taking place between the electrodes which surround the liquid crystals.

Subsequently, in conjunction with the accompanying drawings, the present invention will be described.

Figure 19:
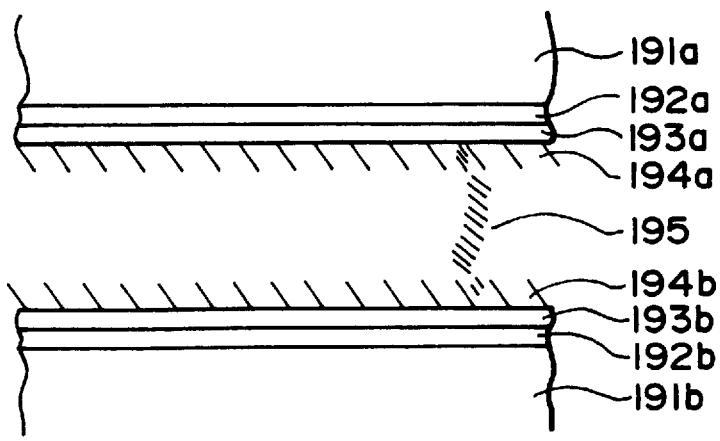
FIG. 19 is a schematic view showing a structural example of a liquid crystal according to the present invention.

FIG. 19 is a schematic view showing a structural example of a liquid crystal according to the present invention. In FIG. 19, reference numerals 191a and 191b designate substrates made of glass or quartz; 192a and 192b, transparent electrodes made of ITO, $SnO_2$, $In_2O_3$, or others, or electrodes made of Al, Au, or others; 193a and 193b, and 194a and 194b, the principal constituents of the present invention- 193a and 193b, the high-molecular weight polymers to which an electrical conductivity is given by a conductive processing while 194a and 194b, column shaped or orientation control layers of SiO and $TiO_2$. These 193a and 194a or 193b and 194b provide the interfacial portion between the electrodes and liquid crystals.

Further, a reference numeral 195 designates a ferroelectric liquid crystal (FLC) layer in which those having spontaneous polarization $P_s$ of an appropriate intensity (1 $nC/cm^2$ to 100 $nC/cm^2$, for example) are uniformly orientated.

A first function of the present invention is to prevent short circuit between the upper and lower electrodes using between the electrodes 192a and 192b high-molecular polymers for which conductivity process is given and a higher limited resistive value than the electrodes 192a and 192b is provided as well. Also, a second function is to perform a desirable gradation display by causing the partial pressure which essentially affects a gradation signal voltage given from the outside to be stably exerted always suitably for the above-mentioned signals. Then, a third function is to obtain a more desirable orientation by the use of a column shaped orientation control layer.

In other words, with the above-mentioned fundamental structure, the present invention provides a liquid crystal cell having a compound layer for separate functions with conductive films 193a and 193b for the purpose of the short circuit prevention and stable liquid crystal partial pressure as well as with a column shaped layer for obtaining a desirable orientation.

The aforesaid high-molecular polymer having conductivity should preferably have a specific resistance of $10^8$ to $2 \times 10^{11}$ Ω.cm. If the specific resistance is smaller than $10^8$ Ω.cm, the insulation between the electrodes 192a and 192a or 192b and 192b is insufficient and the cross talk between pixels becomes inferior. If the specific resistance is greater than $2 \times 10^{11}$ Ω.cm, the discharging of any sufficiently accumulated charge cannot be performed satisfactorily. Also, the greater the dielectric constant of the high-molecular polymer is, the better for the purpose of reducing the influence given to the liquid crystal partial pressure of the accumulated charge, and it should preferably be more than five times that of the conventional polyimide film, that is, more than 20.

Hereinafter, the present invention will be described further in detail in accordance with the embodiments.

In FIG. 19, the embodiment is shown for each of the layers. At first, ITO (indium tin oxide) is formed into a thin film of approximately 700 Å by a sputtering method on the glass substrate of 1.1 mm thick 191 (191a or 191b) to fabricate a transparent electrode 192 (192a or 192b).

Then, on the above-mentioned transparent electrode, a solvent, in which a mixture ($SnO_2$:Sb) of tin oxide of approximately 50 Å granular diameter on the average and ultrafine antimony grains is dispersed in a polymer dispersion solution of siloxane group, is coated by a spinner at a rotational condition of approximately 1,000 r.p.m. to 3,000 r.p.m. After that, a heat treatment is given at 150° C. for 60 minutes to form a polysiloxane film 193 (193a or 193b) of approximately 1,500 Å to 500 Å thick.

The conductance or other electrical properties of the above-mentioned high-molecular polymer film (polysiloxane film) 193 can be selected variously by modifying the conductor ratio ($SnO_2$:Sb ratio) of the above-mentioned ultrafine granular mixture or dispersion weight percentage and like of the polymer dispersion solution.

According to the present invention, further on the aforesaid high-molecular polymer film 193, a column shaped orientation layer 194 (194a or 194b) of SiO, $TiO_2$, and others is fabricated subsequently.

Figure 22:
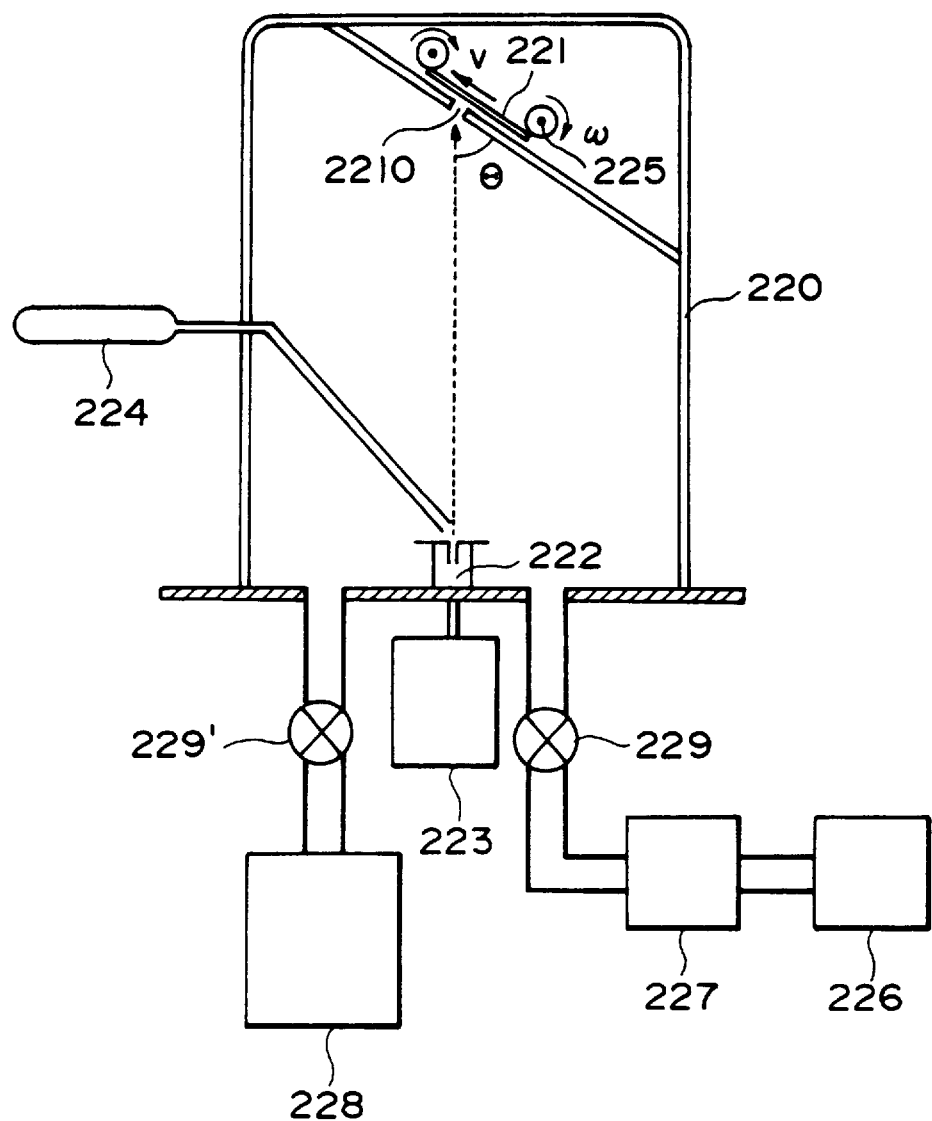
FIG. 22 is a view showing an example of an apparatus for fabricating an SiO rhombic deposition layer according to the present invention.

While it is possible to form the above-mentioned orientation layer 194 by a generally known oblique deposition method, it is preferable to employ a method thereby to perform a deposition at an appropriately low temperature because the above-mentioned column shaped orientation layer 194 should be formed on the aforesaid high-molecular polymer film 193. Now, hereunder, the description will be made of an apparatus for fabricating the SiO oblique deposition layer. In FIG. 22, a reference numeral 220 designates a vacuum chamber; 221, a glass substrate on which ITO is deposited; 222, SiO molecular beam source; 223, a power source for the molecular beam source; 224, an $O_2$ cylinder; 225 feed rollers for the substrate 221; 226, a rotary pump; 227, a mechanical booster pump; 228, a cryopump; 229, a valve; and 2210, a slit.

The SiO molecular beam emitted from the beam source 222 reaches the substrate 221 through the slit 2210 with the supply of $O_2$ obtainable from the $O_2$ cylinder 224. While, the rollers 225 are being rotated at a predetermined angular velocity ω, the substrate 221 is fed at a predetermined velocity. Therefore, on the substrate 221, $SiO_x$ adheres in a uniform film thickness. Also, the substrate 221 is inclined at θ as shown in FIG. 22, thus enabling a column to be formed evenly.

Now, returning to FIG. 19, on the column shaped orientation layer 194 on the glass substrate 191 (191a, for example) on which the electrode 192, high-molecular polymer film 193 and column shaped orientation layer ($SiO_x$ film) 194 as described above are formed, the dispersion solution of silica-beads of 1.5 μm granular diameter is coated by a spinner, and subsequent to being dried, adhesive is print coated. Then after being slightly dried, another sheet of glass substrate 191 (191b, for example) on the column shaped orientation layer of the same type formed is on the opposite side of this substrate as shown in FIG. 19, and is adhesively joined together to structure a cell which provides a space of approximately 1.3 μm for the liquid crystal layer portion to be injected later. In this respect, on the assumption that the opposite structure of the above-mentioned column is as shown in FIG. 19 when the cell is formed, it may be possible to arrange the direction at the time of deposition to be in the inversed parallel or in the parallel direction, or even in the direction slightly deviated therefrom in some cases.

Then, in the present embodiment, an FLC material having its spontaneous polarization intensity of 5 $nC/cm_2$ is injected in vacuum as an example.

Figure 20:
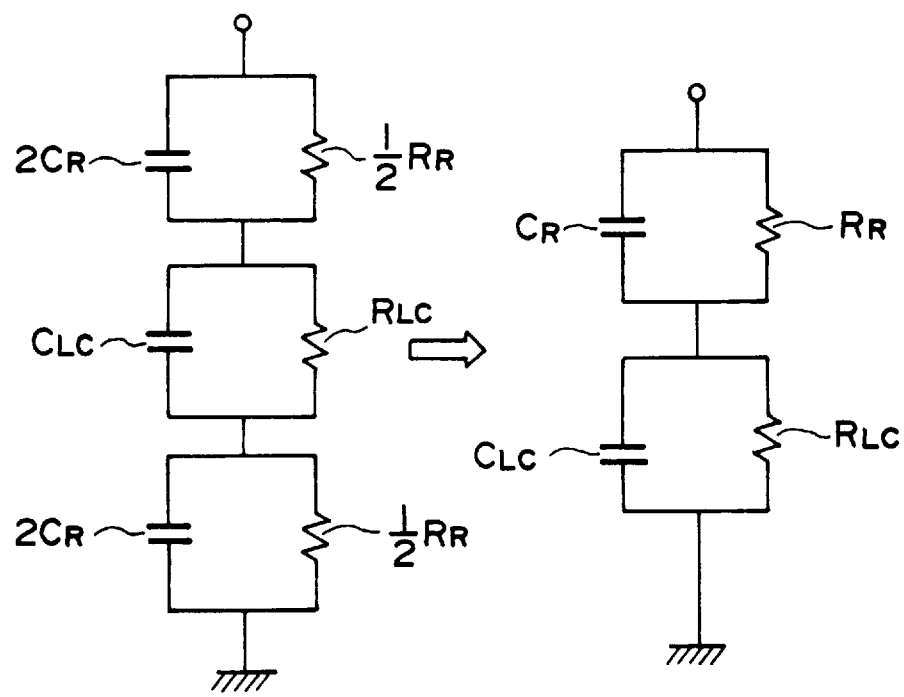
FIG. 20 is a view illustrating the model of an equivalent circuit of the liquid crystal element shown in FIG. 19.

The functional effect of the liquid crystal element according to the present invention, which is formed as described above, is set forth below in conjunction with the equivalent circuit model shown in FIG. 20 and the schematic view shown in FIG. 21 illustrating the charging state at a cross-section of the element.

Figure 21A:
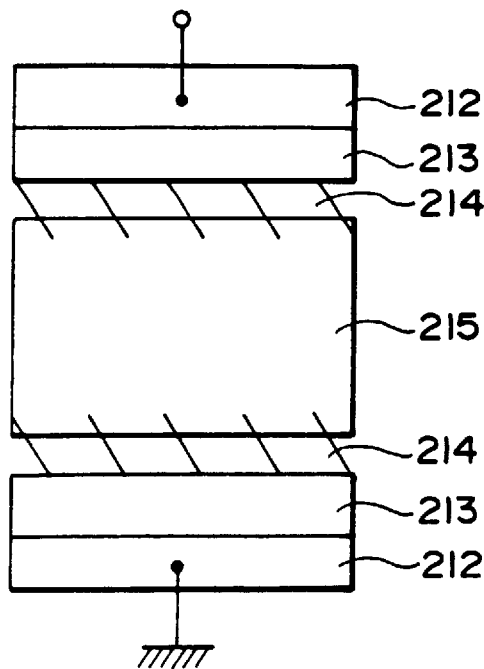
FIGS. 21(a) to 21(b) are schematic views showing the state of cross-sectional charge of the liquid crystal element shown in FIG. 19.

As shown in FIG. 21(a), one of the features of the present invention is that by the use of the column shaped orientation layer, it becomes possible to reduce significantly the effect of the conductivity cut-off due to the electrical impedance sustained by the orientation layer itself as compared with the conventional orientation layer of polyimide rubbing film and others.

Then, the conductive high-molecular polymer film formed by the ultrafine granular dispersion which is used for the above-mentioned embodiment according to the present invention makes it possible to reduce its film time constants ($C_R$ $R_R$) by making its resistance sufficiently small with respect to the usual insulating orientation film (the above-mentioned polyimide or polyvinyl alcohol, for example) and to keep its capacity $C_R$ in a greater amount if the film thickness is the same.

Figures 21B, 21C, 21D:
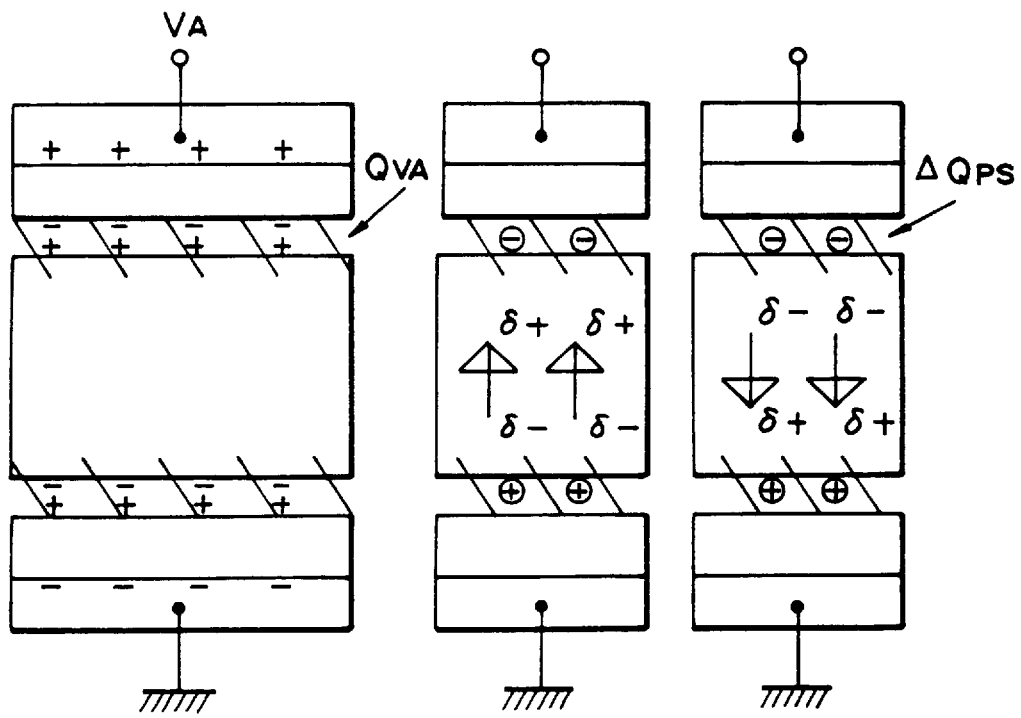

In other words, it is conventionally considered that the aforesaid transmittance variation, hysteresis, and other phenomenal problems are caused by the injected charge $\Delta Q_{VA}$ which is varied on the basis of the respective time constant differential (the difference between $C_R$ $R_R$ and $C_{LC}$ $R_{LC}$) between the film 213 and FLC layer 215 when the external voltage $V_A$ shown at (b) in FIG. 21 is applied and the charge $\Delta Q_{PS}$ which is varied by the difference in the directions in various intermediate gradation states of the spontaneous polarization $P_s$ genuine to the FLC compared in FIGS. 21(c) and 21(d). Consequently, the conductive film 3 formed by the aforesaid ultrafine granular dispersion in the present embodiment makes it possible to reduce the effect caused by the variation of $\Delta Q_{VA}$ and $\Delta Q_{PS}$ sooner by keeping its time constants ($C_R$ $R_R$) in a small amount and at the same time, to make the values $\Delta Q_{VA}/(C_{LC}+C_R)$ and $\Delta Q_{PS}/(C_{LC}+C_R)$ expressed as a coefficient of the effect of $\Delta Q_{VA}$ and $\Delta Q_{PS}$ on the deviation of the liquid crystal sufficiently small by keeping the capacity $C_R$ in a large amount.

When the inventor hereof attempted to identify the impedance in the cell state of the above-mentioned conductive film, a value in the vicinity of $C_R$~40 nF, $R_R$~30 MΩ is obtained as compared to the value (C~2 nF, R~8 GΩ) which is identified likewise with the polyimide rubbing film in the electrode intersecting pixel of 2 mm×2 mm=0.04 $cm^2$ square, for example, and thus a value which is lower by more than one digit for the time constant value and a value as large as 20 times for the capacitance are obtained.

As a result, the unstability, hysteresis, and various other phenomena cited as subjects of the present invention have been significantly improved. Hence desirable gradation characteristics are obtained.

In this respect, with the driving (open mode driving) by the use of the active matrix switching element of TFT (thin film transistor) in view, the above description has been made, but it is possible for the pixel electrodes of the present invention to demonstrate the above-mentioned time constant (which functions as a synthesized time constant with the LC layer) of the conductive film as well as the capacitance effect even by the method of a simple type driving which is always coupled to the external circuit at a low impedance.

Now, while the embodiments of the present invention have been described as above, it is to be understood that the present invention is not confined thereto and that there are many modes which may be implemented other than the above-mentioned specific structures.

For example, as regards the above-mentioned conductive film, it may be possible to mix various metallic conductive ultrafine grains with other polymers of the polysiloxane group, or to use other methods to obtain conductivity by using polypyrol, polyacetylene, polythiophen, or other general conductive high-molecular film within the allowable range of film formation.

As regards the electrical properties of the above-mentioned conductive film, the inventors hereof have found that whereas the conventional polyimide rubbing film has its dielectric constant ε~ approximately 4 and ρ~ approximately $10^{13}$ Ω.cm or more when the aforesaid hysteresis, unstability, and the like are carefully observed as a subject to be solved, it is possible to obtain desirable results of improvements by an element according to the present invention if the values should be made desirably five times to 20 times or more in terms of the dielectric constant $\epsilon$ with respect to the film thickness in the cell state and also, a 1/50 or smaller value in digit as $\rho$ likewise. Or an element of $10^{-9}$S/cm (siemens.cm$^{-1}$) or more should be desirably usable as the one having a higher conductivity.

Furthermore, as the column shaped orientation layer used for the above-mentioned embodiments, $TiO_2$, $ZrO_2$, $SiO_2$ or other materials which can be fabricated into a film by the rhombic deposition method can be suitably used beside SiO for the present invention provided that the length of its column is controlled so as not to be too long.

Further, as a ferroelectric liquid crystal to be used for the present invention, it is possible to obtain the one having its liquid crystal resistance of approximately $10^{11}$ $\Omega$.cm or less by reducing the resistance with the mixture of a dopant given below as an example for 0.1% to 1% as weight ratio. Hence are obtained gradation characteristics which have been further improved. Conceivably, this is possible because the effect of the variation represented by the charges $\Delta Q_{VA}$ or $\Delta Q_{PS}$ can be reduced rapidly by reducing the resistance of the ferroelectric liquid crystal.

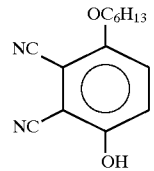

As described above, according to the present invention, a desirable gradation driving element capable of performing a stable driving can be implemented. Particularly, by the use of the high-molecular polysiloxone polymer with its orientation film having a ultrafine granular conductive substance dispersed therein, the lower resistance of the orientation film can be achieved, so that the hysteresis phenomenon in the V-T characteristics genuine to the intermediate gradation display using ferroelectric liquid crystals and the unstability caused by the DC component can be restrained. Moreover, by making the orientation film resistance low, the orientational disturbance which occurs in general can be controlled to obtain an evenly uniform orientation.

What is claimed is:

1. A liquid crystal device, comprising:
   a pair of substrates sandwiching a chiral smectic liquid crystal therebetween;
   a matrix comprising plural transistors for applying a voltage to said liquid crystal;
   a drain electrode for applying a voltage to said liquid crystal at a corresponding pixel;
   an opposing electrode opposing said drain electrode through said liquid crystal, wherein said liquid crystal of said pixel is supplied with a reset voltage of one polarity and a write voltage of the other polarity, through said transistor; and
   an orientation film covering at least one of said drain electrode and said opposing electrode, said orientation film containing plural conductive particles having a maximum particle diameter of about 100 Å.

2. A liquid crystal device according to claim 1, wherein said orientation film comprises said conductive particles dispersed into a polymer material.

3. A liquid crystal device according to claim 1, wherein said conductive particles comprise tin oxide doped with antimony.

4. A liquid crystal device according to claim 2, wherein said polymer material has a resistivity of $10^8$–$2\times10^{11}$ $\Omega$.cm.

5. A liquid crystal device according to claim 2, wherein said polymer material has a dielectric constant greater than 20.

6. A liquid crystal device, comprising:
   a pair of substrate sandwiching a chiral smectic liquid crystal therebetween;
   a matrix comprising plural transistors for applying a voltage to said liquid crystal;
   a drain electrode for applying a voltage to said liquid crystal at a corresponding pixel;
   an opposing electrode opposing said drain electrode through said liquid crystal; and
   an orientation film covering at least one of said drain electrode and said opposing electrode, said orientation film containing plural conductive particles having a maximum particle diameter of about 100 Å.

7. A liquid crystal device according to claim 6, wherein said orientation film comprises said conductive particles dispersed into a polymer material.

8. A liquid crystal device according to claim 6, wherein said conductive particles comprise tin oxide doped with antimony.

9. A liquid crystal device according to claim 7, wherein said polymer material has a resistivity of $10^8$–$2\times10^{11}$ $\Omega$.cm.

10. A liquid crystal device according to claim 7, wherein said polymer material has a dielectric constant greater than 20.

11. A liquid crystal device, comprising:
    a pair of substances sandwiching a liquid crystal therebetween;
    a matrix comprising plural transistors for applying a voltage to said liquid crystal;
    a drain electrode for applying a voltage to said liquid crystal at a corresponding pixel;
    an opposing electrode opposing said drain electrode through said liquid crystal; and
    an orientation film covering at least one of said drain electrode and said opposing electrode, said orientation film containing plural conductive particles having a maximum particle diameter of about 100 Å.

12. A liquid crystal device according to claim 11, wherein said orientation film comprises said conductive particles dispersed into a polymer material.

13. A liquid crystal device according to claim 11, wherein said conductive particles comprise tin oxide doped with antimony.

14. A liquid crystal device according to claim 12, wherein said polymer material has a resistivity of $10^8$–$2\times10^{11}$ $\Omega$.cm.

15. A liquid crystal device according to claim 12, wherein said polymer material has a dielectric constant greater than 20.

* * * * *

UNITED STATES PATENT AND TRADEMARK OFFICE
CERTIFICATE OF CORRECTION

PATENT NO. : 5,838,410

DATED : November 17, 1998

INVENTOR(S) : RYOJI FUJIWARA ET AL.

It is certified that error appears in the above-identified patent and that said Letters Patent is hereby corrected as shown below:

Title page, item
[57] ABSTRACT

Line 2, "an" should read --a--.

COLUMN 1

Line 28, "hundreds" should read --hundred--.

COLUMN 3

Line 54, "circuit" should read --circuit is used to apply--.
Line 56, "are applied" should be deleted.

COLUMN 4

Line 39, "increasing" should read --increasingly--.
Line 63, "characteristics" should read --characteristic--.

COLUMN 5

Line 50, "p$^j$" should read --p$^1$--.

COLUMN 6

Line 8, "and" should read --and preferably--.
Line 9, "electroptic" should read --electrooptic--.
Line 10, "the" should read --this--.
Line 32, "is" should read --are--.
Line 37, "1.5 $\mu$m $\phi$," should read --1.5 $\mu$m$\phi$--.
Line 43, "for" should read --in--.

UNITED STATES PATENT AND TRADEMARK OFFICE
CERTIFICATE OF CORRECTION

PATENT NO.  : 5,838,410

DATED       : November 17, 1998

INVENTOR(S) : RYOJI FUJIWARA ET AL.

It is certified that error appears in the above-identified patent and that said Letters Patent is hereby corrected as shown below:

COLUMN 7

Line 34, "are," should read --are--.

COLUMN 8

Line 3, "A1" should read --Al--.
    Line 15, "electrodes using" should be deleted.
    Line 16, "between the" should be deleted; and "192b" should read --192b using--.
    Line 17, "for which conductivity process is given and" should read --193a and b for which--.
    Line 19, "as well" should be deleted.
    Line 36, "192a and 192a" should read --192a and 193a--.
    Line 37, "192b and 192b" should read --192b and 193b--.

COLUMN 9

Line 22, "While," should read --While--.
    Line 38, "formed is" should read --is formed--.

COLUMN 10

Line 25, "inventor" should read --inventors--.
    Line 34, "unstability" should read --instability--.
    Line 64, "unstability" should read --instability--.

COLUMN 11

Line 37, "unstability" should read --instability--.

UNITED STATES PATENT AND TRADEMARK OFFICE
CERTIFICATE OF CORRECTION

PATENT NO. : 5,838,410

DATED : November 17, 1998

INVENTOR(S) : RYOJI FUJIWARA ET AL.

It is certified that error appears in the above-identified patent and that said Letters Patent is hereby corrected as shown below:

COLUMN 12

Line 10, "substrate" should read --substrates--.
Line 36, "substances" should read --substrates--.

Signed and Sealed this

Thirtieth Day of November, 1999

Attest:

Q. TODD DICKINSON

Attesting Officer

Acting Commissioner of Patents and Trademarks